(12) United States Patent
Wen et al.

(10) Patent No.: US 12,389,408 B2
(45) Date of Patent: Aug. 12, 2025

(54) SERVICE BASED UPLINK RETRANSMISSION

(71) Applicant: Nokia Technologies Oy, Espoo (FI)

(72) Inventors: Pingping Wen, Shanghai (CN); Ping Yuan, Beijing (CN); Chunli Wu, Beijing (CN); Samuli Turtinen, Ii (FI); Benoist Sebire, Tokyo (JP)

(73) Assignee: NOKIA TECHNOLOGIES OY, Espoo (FI)

( * ) Notice: Subject to any disclaimer, the term of this patent is extended or adjusted under 35 U.S.C. 154(b) by 477 days.

(21) Appl. No.: 17/642,977

(22) PCT Filed: Oct. 15, 2019

(86) PCT No.: PCT/CN2019/111337
§ 371 (c)(1),
(2) Date: Mar. 15, 2022

(87) PCT Pub. No.: WO2021/072658
PCT Pub. Date: Apr. 22, 2021

(65) Prior Publication Data
US 2022/0338240 A1 Oct. 20, 2022

(51) Int. Cl.
*H04W 72/14* (2009.01)
*H04L 1/1812* (2023.01)
(Continued)

(52) U.S. Cl.
CPC ........... *H04W 72/23* (2023.01); *H04L 1/1812* (2013.01); *H04L 1/1887* (2013.01)

(58) Field of Classification Search
CPC ... H04W 72/20; H04W 72/23; H04W 72/569; H04W 72/1268; H04L 1/1825;
(Continued)

(56) References Cited

U.S. PATENT DOCUMENTS

2012/0020275 A1* 1/2012 Wei .................. H04L 1/188
370/312
2020/0092692 A1* 3/2020 Wang .................. H04W 76/14
(Continued)

FOREIGN PATENT DOCUMENTS

CN 101064664 A 10/2007
CN 101854588 A 10/2010
(Continued)

OTHER PUBLICATIONS

Extended European Search Report for European Application No. 19948996.4 dated Mar. 27, 2023, 12 pages.
(Continued)

Primary Examiner — Jung Liu
(74) Attorney, Agent, or Firm — ALSTON & BIRD LLP

(57) ABSTRACT

According to embodiments of the present disclosure, service-based retransmission scheme for uplink in NTN has been proposed, which can support multiple retransmission schemes based on service type for uplink. The network device determines different retransmission schemes based on the QoS requirements of the services. The terminal device selects the retransmission scheme for the service. In this way, the QoS of different service and reliability of MAC CE can be guaranteed.

20 Claims, 8 Drawing Sheets

(51) Int. Cl.
*H04L 1/1867* (2023.01)
*H04W 72/23* (2023.01)

(58) Field of Classification Search
CPC ... H04L 1/1822; H04L 1/1812; H04L 1/1887; H04L 1/1864; H04L 1/1896; H04L 1/1867
See application file for complete search history.

(56) References Cited

U.S. PATENT DOCUMENTS

| | | | |
|---|---|---|---|
| 2022/0045803 A1* | 2/2022 | Lin | H04L 1/1822 |
| 2022/0216952 A1* | 7/2022 | Nishio | H04L 1/1864 |
| 2022/0217745 A1* | 7/2022 | Lee | H04W 72/20 |
| 2022/0224447 A1* | 7/2022 | Seidel | H04W 72/23 |
| 2022/0240421 A1* | 7/2022 | Zhang | H05K 7/20772 |
| 2022/0286235 A1 | 9/2022 | Ranta-Aho et al. | |

FOREIGN PATENT DOCUMENTS

| | | |
|---|---|---|
| CN | 108923894 A | 11/2018 |
| CN | 109982436 A | 7/2019 |
| WO | WO 2016/185081 A1 | 11/2016 |

OTHER PUBLICATIONS

Nokia et al., "Discussion on LCP Procedure for NTN", 3GPP TSG-RAN WG2 Meeting #107bis, R2-1913388, (Oct. 14-18, 2019), 5 pages.

"3rd Generation Partnership Project; Technical Specification Group Radio Access Network; NR; Medium Access Control (MAC) protocol specification (Release 15)", 3GPP TS 38.321 v15.7.0, (Sep. 2019), 78 pages.

"3rd Generation Partnership Project; Technical Specification Group Radio Access Network; NR; Multiplexing and channel coding (Release 17)", 3GPP TS 38.212 v.17.0.0, (Dec. 2021), 190 pages.

"3rd Generation Partnership Project; Technical Specification Group Radio Access Network; NR; Radio Resource Control (RRC) protocol specification (Release 15)", 3GPP TS 38.331 v15.7.0, (Sep. 2019), 527 pages.

"3rd Generation Partnership Project; Technical Specification Group Radio Access Network; Solutions for NR to support non-terrestrial networks (NTN) (Release 16)", 3GPP TR 38.821 v0.7.0, (May 2019), 84 pages.

"3rd Generation Partnership Project; Technical Specification Group Radio Access Network; Study on New Radio (NR) to support non terrestrial networks (Release 15)", 3GPP TR 38.811 V15.0.0, (Jun. 2018), 118 pages.

Ericsson, "On the Granularity of Uplink Scheduling in Lte", 3GPP RAN WG2-RAN2#53, R2-061415, (May 8-12, 2006), 4 pages.

Ericsson, "Introduction of Release-17 NTN", 3GPP TSG-RAN WG2 Meeting #117-e, Change Request 38.331 CR 2930, R2-2203157, (Feb. 2022), 1314 pages.

Fraunhofer HHI et al., "Physical Layer Procedures for Unicast and Groupcast", 3GPP TSG RAN WG1 Meeting #95, R1-1812401, (Nov. 12-16, 2018), 8 pages.

Interdigital, "Rel-17 NTN Stage-3 CR for TS 38.321", 3GPP RAN WG2 Meeting #117-e, R2-2203425, (Feb. 21-Mar. 3, 2022), 42 pages.

International Search Report and Written Opinion for Patent Cooperation Treaty Application No. PCT/CN2019/111337 dated Jul. 15, 2020, 9 pages.

Office Action for Vietnamese Application No. 1-2022-03051 dated Jun. 20, 2022, 2 pages.

Office Action for Chinese Application No. 201980101357.X dated Apr. 24, 2024, 8 pages.

Office Action for Chinese Application No. 201980101357.X dated May 27, 2023, 8 pages.

Office Action for European Application No. 19948996.4 dated Jun. 11, 2025, 5 pages.

* cited by examiner

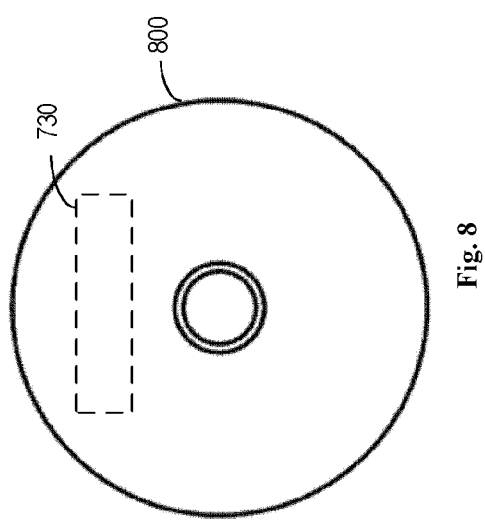

SERVICE BASED UPLINK RETRANSMISSION

CROSS-REFERENCE TO RELATED APPLICATIONS

This application is a national phase entry of International Application No. PCT/CN2019/111337 filed Oct. 15, 2019, the entire contents of which are incorporated herein by reference.

FIELD

Embodiments of the present disclosure generally relate to communication techniques, and more particularly, to methods, devices and computer readable medium for service based uplink transmission.

BACKGROUND

With developments of communication systems, new technologies have been proposed. For example, techniques for non-terrestrial network (NTN) have been proposed. The round trip time (RTT) estimated for NTN networks is usually very high, which is different from in cellular deployments. Thus, uplink retransmission in NTN needs to be further studied.

SUMMARY

Generally, embodiments of the present disclosure relate to a method for service-based uplink retransmission and corresponding devices.

In a first aspect, there is provided a first device. The first device comprises at least one processor; and at least one memory including computer program codes; the at least one memory and the computer program codes are configured to, with the at least one processor, cause the first device to in accordance with an establishment of a link for a first device between a first device and a second device, receive configuration indicating a first retransmission scheme for the first service, the at least one retransmission scheme satisfying a requirement of quality of service of at least one service. The first device is also caused to obtain an uplink grant. The first device is further caused to in accordance with a determination that data for one or more services is to be transmitted, transmit the data for the at least one services on the first device based at least in part on the uplink grant.

In a second aspect, there is provided a second device. The second device comprises at least one processor; and at least one memory including computer program codes; the at least one memory and the computer program codes are configured to, with the at least one processor, cause the second device to in accordance with an establishment of a link for a first device between a first device and a second device, determine a first retransmission scheme used by the first device based at least in part on a first requirement of quality of service of a first service. The second device is also caused to comparing the first retransmission scheme with a second retransmission scheme used by a second service. The second device is further caused to generate configuration at least comprising the first retransmission scheme based on the comparison. The second device is yet caused to transmit the configuration to the first device.

In a third aspect, there is provided a method. The method comprises in accordance with an establishment of a link for a first device between a first device and a second device, receiving, at the first device and from the second device, configuration indicating at least one retransmission scheme for the first service, the at least one retransmission scheme satisfying a requirement of quality of service of at least one service. The method also comprises obtaining an uplink grant. The method further comprises in accordance with a determination that data for one or more services is to be transmitted, transmitting the data for the at least one service on the first device based at least in part on the uplink grant.

In a fourth aspect, there is provided a method. The method comprises in accordance with an establishment of a link for a first device between a first device and a second device, determining, at the second device, a first retransmission scheme used by the first device based at least in part on a first requirement of quality of service of a first service. The method also comprises comparing the first retransmission scheme with a second retransmission scheme used by a second service. The method further comprises generating configuration at least comprising the first retransmission scheme based on the comparison. The method yet comprises transmitting the configuration to the first device.

In a fifth aspect, there is provided an apparatus. The apparatus comprises means for in accordance with an establishment of a link for a first device between a first device and a second device, receiving, at the first device and from the second device, configuration indicating at least one retransmission scheme for the first service, the at least one retransmission scheme satisfying a requirement of quality of service of at least one service; means for obtaining an uplink grant; and means for in accordance with a determination that data for one or more services is to be transmitted, transmitting the data for the at least one service on the first device based at least in part on the uplink grant.

In a sixth aspect, there is provided an apparatus. The apparatus comprises means for in accordance with an establishment of a link for a first device between a first device and a second device, determining, at the second device, a first retransmission scheme used by the first device based at least in part on a first requirement of quality of service of a first service; means for comparing the first retransmission scheme with a second retransmission scheme used by a second service; means for generating configuration at least comprising the first retransmission scheme based on the comparison; and means for transmitting the configuration to the first device.

In a seventh aspect, there is provided a computer readable medium comprising program instructions for causing an apparatus to perform at least the method according to the above third or fourth aspect.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, where:

FIG. 8 illustrates a block diagram of an example computer readable medium in accordance with some example embodiments of the present disclosure.

Throughout the drawings, the same or similar reference numerals represent the same or similar element.

DETAILED DESCRIPTION

Figure 1:
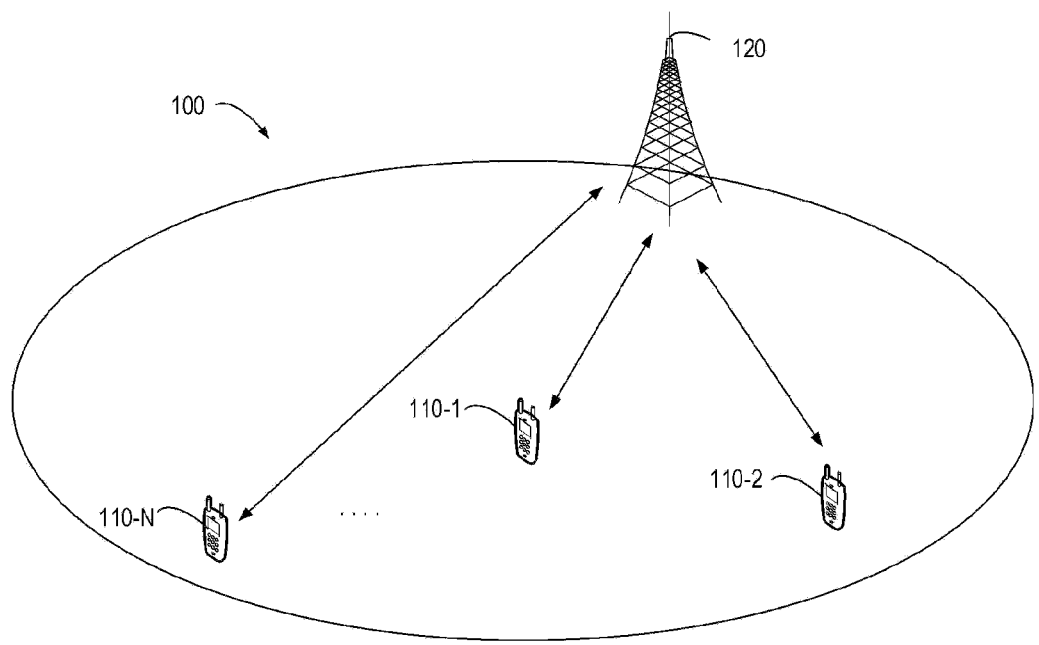
FIG. 1 illustrates a schematic diagram of a communication system according to according to embodiments of the present disclosure.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an example embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:
(a) hardware-only circuit implementations (such as implementations in only analog and/or digital circuitry) and
(b) combinations of hardware circuits and software, such as (as applicable):
(i) a combination of analog and/or digital hardware circuit(s) with software/firmware and
(ii) any portions of hardware processor(s) with software (including digital signal processor(s)), software, and memory(ies) that work together to cause an apparatus, such as a mobile phone or server, to perform various functions) and
(c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as Long Term Evolution (LTE), LTE-Advanced (LTE-A), Wideband Code Division Multiple Access (WCDMA), High-Speed Packet Access (HSPA), Narrow Band Internet of Things (NB-IoT), New Radio (NR), non-terrestrial network (NTN), satellite system and so on. Furthermore, the communications between a terminal device and a network device in the communication network may be performed according to any suitable generation communication protocols, including, but not limited to, the first generation (1G), the second generation (2G), 2.5G, 2.65G, the third generation (3G), the fourth generation (4G), 4.5G, the future fifth generation (5G) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which a terminal device accesses the network and receives services therefrom. The network device may refer to a base station (BS) or an access point (AP), for example, a node B (NodeB or NB), an evolved NodeB (eNodeB or eNB), a NR NB (also referred to as a gNB), a Remote Radio Unit (RRU), a radio header (RH), a remote radio head (RRH), a relay, a low power node such as a femto, a pico, and so forth, depending on the applied terminology and technology.

The term "terminal device" refers to any end device that may be capable of wireless communication. By way of example rather than limitation, a terminal device may also be referred to as a communication device, user equipment (UE), a Subscriber Station (SS), a Portable Subscriber Station, a Mobile Station (MS), or an Access Terminal (AT).

The terminal device may include, but not limited to, a mobile phone, a cellular phone, a smart phone, voice over IP (VoIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. In the following description, the terms "terminal device", "communication device", "terminal", "user equipment" and "UE" may be used interchangeably.

As mentioned above, the RTT estimated for NTN networks is usually very high, which is different from in cellular deployments. The $3^{rd}$ generation partnership project (3GPP) has initiated a study item to extend the applicability to non-terrestrial network (NTN) in Release 15, more specifically being able to use the 5G radio access for satellite links. The key impact on new radio (NR) has been identified and the solutions are discussed in Release 16 and the work item in Release 17.

In current $3^{rd}$ generation partnership project (3GPP) discussions, there are different deployment scenarios regarding the satellite altitude. The assumptions are that the satellites can either be deployed using GEO (geostationary earth orbit) or LEO (low earth orbit) satellites. Table 1 below shows platform altitude and orbit definition.

TABLE 1

| Platform | Altitude range | Orbit |
| --- | --- | --- |
| Low-Earth Orbit (LEO) satellite | 300-1500 km | Circular around the earth |
| Medium-Earth Orbit (MEO) satellite | 7000-25000 km | |
| Geostationary Earth Orbit (GEO) satellite | 35 786 km | notional station keeping position fixed in terms of elevation/azimuth with respect to a given earth point |

Table 2 shows the maximum coverable distance for NTN satellites and the respective round trip time latency.

TABLE 2

| Scenarios | GEO based non-terrestrial access network (Scenario A and B) | LEO based non-terrestrial access network (Scenario C & D) |
| --- | --- | --- |
| Altitude | 35,786 km | 600 km<br>1,200 km |
| Max distance between satellite and user equipment at min elevation angle | 40,586 km | 1,932 km (600 km altitude)<br>3,131 km (1,200 km altitude) |
| Max Round Trip Delay (propagation delay only) | Scenario A: 541.14 ms (service and feeder links)<br>Scenario B: 271.57 ms (service link only) | Scenario C: (transparent payload: service and feeder links)<br>25.76 ms(600 km)<br>41.75 ms(1200 km)<br>Scenario D: (regenerative payload: service link only)<br>12.88 ms(600 km)<br>20.87 ms(1200 km) |

As shown in Table 2, the RTT estimated for NTN networks is very high (between 12.88 and 541 ms) which is different from in current cellular deployments. Generally, any system that has a propagation delay larger than the number of available hybrid automatic repeat request (HARQ) processes, may suffer from HARQ stalling. High transmission delays in NTN (especially GEO) may require transmitters to maintain a large number of HARQ processes, which seems to be impractical due to the extreme buffer size requirement for receivers' soft buffer and large signaling requirement on indicating the HARQ process number. Additionally, the retransmission may also cause the long latency for a packet. However, similar to the terrestrial network, HARQ has valuable gains in NTN, to provide reliability with lower cost (than ARQ) by the gain of soft combining and shorter latency (than ARQ). Therefore, the following two principles are captured for further study: enhancing existing HARQ operation and limiting HARQ capabilities and/or disabling HARQ.

In the study item, the 3GPP has made the agreements on HARQ and retransmission below:
(1) Both options (enhancing HARQ and disabling HARQ) will be studied.
(2) The network should be able to configure the UE, mentioning whether HARQ is "turned off". There is no feedback for transmission if HARQ is turned off.
(3) Enabling/disabling of HARQ feedback is a network decision.
(4) If HARQ feedback is disabled, blind HARQ (re) transmissions are still possible to improve robustness.
(5) Retransmissions at one or several layers shall be supported for NTN and configurable by the network.
(6) It should be possible to semi-statically enable/disable HARQ feedback by RRC signaling.
(7) The enabling/disabling of HARQ feedback can be configurable on a per UE and per HARQ process basis via RRC signaling.

The different service data and the control signaling have different requirements of quality of service (QoS). The control signaling and mission critical data may require high reliability with smallest latency, while other services (for example, streaming and video which is less critical) may have lower reliability requirement. So, given the different requirements for different service, different retransmission schemes should be supported.

Currently, four types of retransmission schemes are discussed in 3GPP for uplink data and each of them is suitable to different services with different advantages which can be benchmarked from reliability/latency and resource usage point of view:

(1) Single transmission only (i.e. HARQ disabled with one-shot data transmission and no retransmission): with low reliability and low resource usage
(2) Blind (re)transmission with aggregation factor larger than 1 (i.e. continuous multiple transmissions for one TBS): with high reliability, low latency and high resources usage
(3) Blind (re)transmission with downlink control information (DCI) scheduling (i.e. multiple transmissions for one transport block size (TBS) on sparse transmission time interval (TTI) based on scheduling flexibility/gain): with high reliability, low latency and medium resource usage
(4) Legacy HARQ enabled (i.e. with retransmission based on gNB decoding result): with high reliability, high latency and low resources usage.

Although there were extensive discussions on HARQ and retransmission schemes for NTN in 3GPP, most of discussions focus on downlink. In uplink, it may be up to the network device to decide whether HARQ is disabled or not based on the decoding results and only need to indicate the new transmission and retransmission with NDI flag in DCI. So it is not necessary to inform the terminal device on HARQ disabling/enabling or with blind retransmission.

However, in uplink, the terminal device may multiplex the packet from different services (logical channels) into one medium access control (MAC) protocol data unit (PDU) based on link control protocol (LCP) procedure. In conventional long-term evolution and NR system, it is assumed that the HARQ functionality is always on. Therefore, the conventional LCP has no restriction on multiplexing the data from different services. But in NTN system, if the data from different services with different QoS requirements are multiplexing into one MAC PDU as conventional LCP, then it is hard for the network device to determine the retransmission scheme for the MAC PDU to guarantee the QoS of different services, for example, to enable the HARQ retransmission or use blind retransmission scheme for a MAC PDU with mixed QoS traffic.

In addition, MAC control element (CE) is the control element generated at MAC layer where reliability is important for some features to work properly and it is critical to find a way out to make sure MAC CE can be transmitted reliably.

In conventional systems, the HARQ functionality is always on and there are no multiple retransmission options like NTN system in the uplink. The LCP procedure does not consider the restrictions on multiplexing the service into one packet for one grant with different retransmission options.

In conventional systems, radio resource controlling (RRC) additionally controls the LCP procedure by configuring mapping restrictions for each logical channel:
allowed subcarrier spacing-List which sets the allowed Subcarrier Spacing(s) for transmission;
max physical uplink shared channel (PUSCH)-Duration which sets the maximum PUSCH duration allowed for transmission;
configuredGrantType1Allowed which sets whether a configured grant Type 1 can be used for transmission;
allowedServingCells which sets the allowed cell(s) for transmission.

In addition, the MAC CE transmission can be transmitted/piggybacked on PUSCH of any grant. There are no solutions proposed on uplink HARQ in NTN discussion in 3 GPP.

According to embodiments of the present disclosure, service-based retransmission scheme for uplink in NTN has been proposed, which can support multiple retransmission schemes based on service type for uplink. The network device determines different retransmission schemes based on the QoS requirements of the services. The terminal device selects the retransmission scheme for the service. In this way, the QoS of different service and reliability of MAC CE can be guaranteed.

FIG. 1 illustrates a schematic diagram of a communication system in which embodiments of the present disclosure can be implemented. The communication system 100, which is a part of a communication network, comprises a device 110-1, a device 110-2, . . . , a device 110-N, which can be collectively referred to as "device(s) 110." The communication system 100 further comprises a device 120. One or more devices are associated with and covered by a cell. It is to be understood that the number of devices and cells shown in FIG. 1 is given for the purpose of illustration without suggesting any limitations. The communication system 100 may comprise any suitable number of devices and cells. In the communication system 100, the device 110 and the device 120 can communicate data and control information to each other. In the case that the device 110 is the terminal device and the device 120 is the network device, a link from the device 120 to the device 110 is referred to as a downlink (DL), while a link from the device 110 to the device 120 is referred to as an uplink (UL). The number of devices shown in FIG. 1 is given for the purpose of illustration without suggesting any limitations.

Communications in the communication system 100 may be implemented according to any proper communication protocol(s), comprising, but not limited to, cellular communication protocols of the first generation (1G), the second generation (2G), the third generation (3G), the fourth generation (4G) and the fifth generation (5G) and on the like, wireless local network communication protocols such as Institute for Electrical and Electronics Engineers (IEEE) 802.11 and the like, and/or any other protocols currently known or to be developed in the future. Moreover, the communication may utilize any proper wireless communication technology, comprising but not limited to: Code Divided Multiple Address (CDMA), Frequency Divided Multiple Address (FDMA), Time Divided Multiple Address (TDMA), Frequency Divided Duplexer (FDD), Time Divided Duplexer (TDD), Multiple-Input Multiple-Output (MIMO), Orthogonal Frequency Divided Multiple Access (OFDMA) and/or any other technologies currently known or to be developed in the future.

Figure 2:
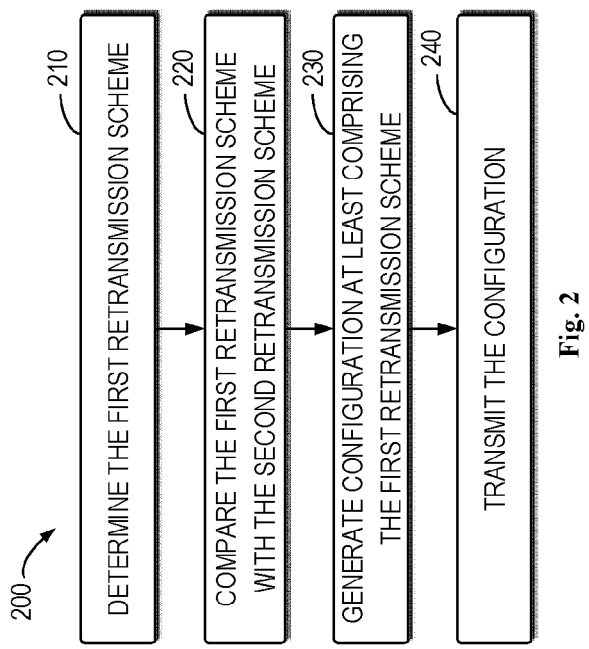
FIG. 2 illustrates a flow chart of a method according to embodiments of the present disclosure.

FIG. 2 illustrates a flow chart of method 200 according to embodiments of the present disclosure. The method 200 can be implemented at any suitable devices. For example, the method may be implemented at the network device 120.

At block 210, the network device 120 determines a first retransmission scheme based at least in part on the first QoS requirement of the first service when the first service is established between the network device 120 and the terminal device 110-1. The term "service" used herein may refer to a radio bearer, a logical channel or a MAC CE. The QoS requirement of a service may comprise one or more of the throughput requirement of the service, a reliability requirement of the service, or a latency requirement of the service, etc. For example, for the control signaling and the mission critical service which have both the high reliability and low latency requirement, the radio bearer for this service can be supported with blind retransmission, while for other service like streaming a video from a movie is less critical, the radio bearer for this service can be supported with single retransmission (HARQ disabling).

The retransmission scheme may comprise one or more of: (1) single transmission only (i.e. HARQ disabled with one-shot data transmission and no retransmission): with low reliability and low resource usage; (2) blind (re)transmission with aggregation factor larger than 1 (i.e. continuous multiple transmissions for one TBS): with high reliability, low latency and high resources usage; (3) blind (re)transmission with downlink control information (DCI) scheduling (i.e. multiple transmissions for one transport block size (TBS) on sparse transmission time interval (TTI) based on scheduling flexibility/gain): with high reliability, low latency and medium resource usage; (4) legacy HARQ enabled (i.e. with retransmission based on the network device decoding result): with high reliability, high latency and low resources usage; and (5) Other potential retransmission scheme in future.

In some embodiments, the network device 120 may determine the supported retransmission scheme based on the QoS requirements and UE capability (for example, maximum HARQ soft buffer size). The network device 120 may also determine the retransmission scheme in association with round trip time.

At block 220, the network device 120 compares the first retransmission scheme with a second retransmission scheme used by a second service. The network device 120 may have the QoS requirements of each service (i.e. radio bearer, logical channel). In some embodiments, the network device 120 may check if the first retransmission scheme is applicable to all services on the terminal device 110-1. In some embodiments, if the services on the terminal device 110-1 have similar QoS requirements and can be supported with the same retransmission scheme, the network device 120 may generate the confirmation indicating the first retransmission scheme without informing the terminal device 110-1 on the retransmission options.

At block 230, the network device 120 generates configuration indicating the first retransmission scheme based on the comparison. It can support service based retransmission scheme for uplink in NTN, thus to guarantee different QoS requirement. Further, MAC CE transmission is reliable even in NTN scenarios for UE supporting multiple retransmission schemes.

If the services have different QoS requirements and can be supported with the different retransmission schemes, each kind of service (e.g, radio bearer/logical channel) can be configured by the network device 120 through RRC signaling for retransmission schemes. For example, if the first retransmission scheme is inapplicable to the second service, the network device 120 may determine a second retransmission scheme for the second service and generate the configuration indicating the first retransmission scheme and the second retransmission scheme.

At block 240, the network device 120 transmits the configuration to the terminal device 110-1. The configuration may comprise different retransmission schemes for different services. In some embodiments, the configuration may one or more of the at least one retransmission scheme, a hybrid automatic repeat request (HARQ) process associated with the at least one retransmission scheme, or at least one logical channel mapped to use a bit in downlink control information.

In some embodiments, each kind of service is configured with one or multiple retransmission schemes requirement by the network device 120 through RRC signaling. Alternatively, each kind of service is associated with one or multiple HARQ processes by the network device 120 through RRC signaling. Each HARQ process may be mapped to different retransmission schemes.

In some embodiments, the network device 120 may transmit the uplink grant to the terminal device 110-1. The network device 120 may transmit one or more of a first retransmission scheme, a hybrid automatic repeat request (HARQ) process associated with the first retransmission scheme, or a bit indicating whether at least one logical channel is suitable to the first retransmission scheme. The information may be transmitted along with the uplink grant.

In some embodiments, the network device 120 may generate one bit indication concerning a first retransmission scheme in the uplink grant and transmit the one bit indication to the terminal device 110-1. In other embodiments, an indication may relate to a logical channel suitable/unsuitable to the first retransmission scheme.

In some embodiments, the network device 120 may generate a first configuration list indicating a group of logical channels are able to use the uplink grant. Alternatively or in addition, the network device 120 may generate a second configuration list indicating a group of logical channels are unable to use the uplink grant. For example, 1 bit in DCI may be associated with a particular type of logical channel and when that bit is signaled, those logical channels can be prohibited or prioritized for this grant. The mapping between the bit and the logical channel may be done explicitly (for example, via an RRC flag in the configuration of the logical channel) or implicitly based on RLC AM mode, or logical channel priority or a mix of all those. For instance, when the bit in DCI is signaled, only bearers with RLC AM mode can be sent, or logical channels above a pre-configured threshold can be included.

In some embodiments, the network device 120 may determine a second retransmission scheme for the second service. The network device 120 may schedule a resource for the second service. The network device 120 may transmit an uplink grant indicating the resource and the second retransmission scheme to the first device.

In some embodiments, the network device 120 may receive data o from the terminal device 110-1. If the network device 120 fails to decode the data, the network device 120 determines the second retransmission scheme. The network device 120 may also schedule the resource and transmit an uplink grant indicating the resource and the second retransmission scheme to the first device.

In some embodiments, the network device 120 may receive a scheduling request for a third retransmission scheme for MAC CE. The network device 120 may allocate a resource for transmitting the MAC CE and determine a third retransmission scheme for the data. The third retransmission may be more reliable than the first retransmission scheme. The network device 120 may transmit an uplink grant indicating the resource and the third retransmission scheme to the first device.

In some embodiments, the network device 120 may schedule the resources as well as determine the retransmission scheme for the uplink grant based on many information such as the channel quality, buffer status and sent to the grant with the retransmission scheme to the terminal device 110-1.

Further, the network device 120 may receive the scheduling request for the MAC CE or specific logical channel data transmission and allocate the resources with retransmission scheme accordingly.

Alternatively or in addition, the network device 120 may schedule the resources but doesn't determine the retransmission scheme for the uplink grant. Furthermore, if the network device 120 can't decode the PUSCH and receive the scheduling request indicating the highest retransmission scheme requirement corresponding to the logical channel which data is included in the MAC PDU, the network device 120 may schedule the resources with the configured retransmission scheme requirement for future retransmission.

In some embodiments, after decoding the MAC PDU and get the corresponding retransmission schemes, the network device 120 may determine the retransmission schemes for the un-decoded packets based on the reported retransmission schemes and make corresponding retransmission scheduling.

In some embodiments, the network device 120 may receive a scheduling request to indicate the target retransmission scheme is inapplicable to a logical channel with a high priority service. The network device 120 may determine a third retransmission scheme and transmit the third retransmission scheme.

Figure 3:
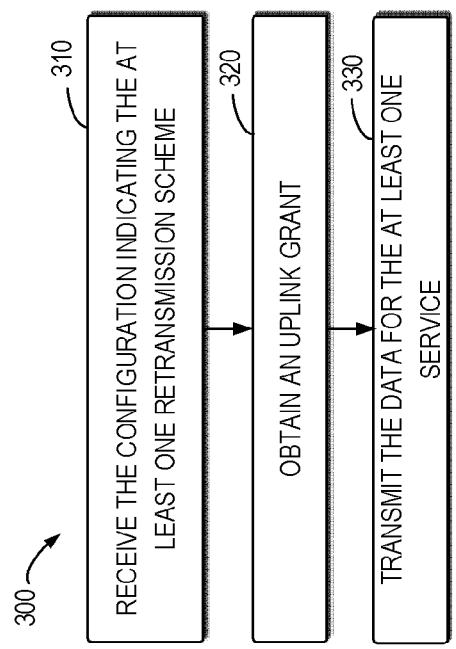
FIG. 3 illustrates a flow chart of a method according to embodiments of the present disclosure.

FIG. 3 illustrates a flow chart of method 300 according to embodiments of the present disclosure. The method 300 can be implemented at any suitable devices. For example, the method may be implemented at the terminal device 110-1.

At block 310, the terminal device 110-1 receives the configuration indicating at least one retransmission scheme if the first service is established between the network device 120 and the terminal device 110-1. The term "service" used herein may refer to a radio bearer, a logical channel or a MAC CE. The QoS requirement of a service may comprise one or more of the throughput requirement of the service, a reliability requirement of the service, or a latency requirement of the service.

In some embodiments, the configuration may comprise one or more of the first retransmission scheme, a hybrid automatic repeat request (HARQ) process associated with the first retransmission scheme, or at least one logical channel mapped to use a bit in downlink control information.

The retransmission scheme may comprise one or more of: (1) single transmission only (i.e. HARQ disabled with one-shot data transmission and no retransmission): with low reliability and low resource usage; (2) blind (re)transmission with aggregation factor larger than 1 (i.e. continuous multiple transmissions for one TBS): with high reliability, low latency and high resources usage; (3) blind (re)transmission with downlink control information (DCI) scheduling (i.e. multiple transmissions for one transport block size (TBS) on sparse transmission time interval (TTI) based on scheduling flexibility/gain): with high reliability, low latency and medium resource usage; (4) legacy HARQ enabled (i.e. with retransmission based on the network device decoding result): with high reliability, high latency and low resources usage; and (5) Other potential retransmission scheme in future. In some embodiments, each kind of service is configured with one or multiple retransmission schemes requirement by the network device 120 through RRC signaling. Alternatively, each kind of service is associated with one or multiple HARQ processes by the network device 120 through RRC signaling. Each HARQ process may be mapped to different retransmission schemes.

At block 320, the terminal device 110-1 obtains the uplink grant. In some embodiments, the terminal device 110-1 may receive the uplink grant from the terminal device 110-1. Alternatively or in addition, the uplink grant may be pre-configured. In some embodiments, the uplink grant may comprise one or more of: the first retransmission scheme, a hybrid automatic repeat request (HARQ) process associated with the first retransmission scheme, or a bit indicating whether at least one logical channel is suitable to the first retransmission scheme.

In other embodiments, an indication may relate to a logical channel suitable/unsuitable to the first retransmission scheme. For example, 1 bit in DCI may be associated with a particular type of logical channel and when that bit is signaled, those logical channels can be prohibited or prioritized for this grant. The mapping between the bit and the logical channel may be done explicitly (for example, via an RRC flag in the configuration of the logical channel) or implicitly based on RLC AM mode, or logical channel priority or a mix of all those. For instance, when the bit in DCI is signaled, only bearers with RLC AM mode can be sent, or logical channels above a pre-configured threshold can be included.

At block 330, the terminal device 110-1 transmits the data to the network device 120 based at least in part on the uplink grant. In some embodiments, the terminal device may receive an indication concerning a first retransmission scheme in the uplink grant. The indication may be transmitted along with the uplink grant. If the first retransmission scheme is applicable to the service, the terminal device 110-1 may transmit the data based on the first retransmission scheme.

In some embodiments, since the network device 120 may map LCH/MAC CE configured retransmission scheme requirement with uplink grant retransmission scheme in LCP for all packets, the terminal device 110-1 may receive the uplink grant as well as the retransmission scheme. The terminal device 110-1 may select the LCH and MAC CEs which is configured the retransmission scheme requirement in RRC same as the indicated retransmission scheme in uplink grant and perform LCP procedure to structure the MAC PDU.

In some embodiments, the terminal device 110-1 may receive one bit indication concerning a first retransmission scheme in the uplink grant. The terminal device 110-1 may obtain a first configuration list indicating a group of logical channels are able to use the uplink grant. If the logical channel is in the first configuration list, the terminal device 110-1 may determine that the logical channel is able to use the uplink grant and transmit the data on the logical channel based on the first retransmission scheme.

In some embodiments, the terminal device 110-1 may receive one bit indication concerning a first retransmission scheme in the uplink grant. The terminal device 110-1 may obtain a second configuration list indicating a group of logical channels are not able to use the uplink grant. If the logical channel is in the second configuration list, the terminal device 110-1 may determine that the logical channel is not able to use the uplink grant. If the logical channel is not in the second configuration list, the terminal device 110-1 may determine that the logical channel is able to use the uplink grant and transmit the data on the logical channel based on the first retransmission scheme.

In some embodiments, if the MAC CE is to be transmitted, the terminal device 110-1 may determine whether the first retransmission scheme is applicable to the MAC CE. If the first retransmission scheme is inapplicable, the terminal device 110-1 may transmit a scheduling request for a second retransmission scheme. The terminal device 110-1 may still transmit the MAC CE based on the first retransmission scheme to the second device. The terminal device 110-1 may further receive further grant indicating the second retransmission scheme. The MAC CE may be kept in terminal device 110-1 until it is included in the packet transmitted by the grant with the second retransmission scheme or it is successfully transmitted.

More specifically, if the MAC CE is triggered but the first retransmission scheme is not applicable (for example, HARQ disabling), the MAC CE can still be selected and included in the packet. Simultaneously, a new scheduling request (SR) trigger is triggered to request the grant with the configured retransmission scheme for the MAC CE.

The terminal device 110-1 may perform the LCP procedure by mapping the configured retransmission scheme requirement of radio bearer (logical channel)/MAC CE (e.g. set by RRC) and the retransmission scheme indicated with the uplink grant (e.g. set by DCI). Only the LCH and MAC CEs which is configured the same retransmission scheme requirement as the indicated uplink grant retransmission scheme can be selected to use this uplink grant.

More specifically, if the MAC CE is triggered in the terminal device 110-1 while the first retransmission scheme is not applicable to the MAC CE (for example, the current uplink grant with unreliable retransmission scheme such as HARQ disabling which is not suitable for MAC CE), the MAC CE can still be selected and piggybacked in the packet but the trigger is not cancelled. Simultaneously, a new SR trigger is introduced and triggered to scheduling request the grant with the configured retransmission scheme for the MAC CE. The SR configuration to be used is the SR configuration of the highest LCH with data buffered. Alternatively, dedicated SR configurations can be configured for requesting uplink grant of different retransmission schemes.

Alternatively, for specific logical channel with high priority service, the similar approach as MAC CE can be applied. If new data of this logical channel is arrived and the previous buffer status report (BSR) report does not include the buffer status of this logical channel, when the uplink grant of which the first retransmission scheme is different from the configured retransmission scheme requirement for this logical channel, the data for this logical channel can be included in the MAC PDU. Simultaneously the terminal device 110-1 may report this information to the network device 120. In some embodiments, the terminal device 110-1 may store the data on the logical channel until receiving an indication of success transmission of the data based on the first retransmission scheme or retransmitting the data based on the second retransmission scheme. The scheduling request may comprise a scheduling request configuration of a highest priority logical channel with data buffered or a dedicated scheduling request configuration for requesting a further uplink grant of the second retransmission scheme.

In some embodiments, since the network device 120 may map LCH/MAC CE configured retransmission scheme requirement with uplink grant retransmission scheme in LCP on-demand (i.e. only for un-decoded packets), the terminal device 110-1 may perform the legacy LCP procedure and can include the data from any logical channel as well as the MAC CE in the uplink grant. After structuring the MAC PDU, the terminal device 110-1 may transmit the MAC PDU to the network device 120, simultaneously the terminal device 110-1 may also transmit the scheduling request including the retransmission scheme that the MAC PDU needed with the report.

The terminal device 110-1 may determine a preferred retransmission scheme based on the rules and report the determined retransmission scheme to the network device 120. In some embodiments, the terminal device 110-1 may determine the preferred retransmission scheme based on the configuration for the LCH with the highest priority which data is included in the MAC PDU. For example, the data from both LCH1 and LCH2 are included in the MAC PDU, LCH1 is configured with blind retransmission with slot aggregation and LCH2 is configured with single retransmission, the priority of LCH1 is higher than the priority of LCH2. The terminal device 110-1 may determine the preferred retransmission scheme of the MAC PDU based on the priority of LCH1, that is, blind retransmission with slot aggregation.

Alternatively or in addition, the network device 120 may configure different priority of each retransmission scheme to the terminal device 110-1. For example, the retransmission scheme of blind retransmission with slot aggregation (with both short latency and high reliability) is the highest priority, the single retransmission (with short latency but low reliability) and traditional HARQ (with high reliability but long latency) are with lower priority. The terminal device 110-1 may determine the preferred retransmission scheme based on the retransmission scheme with highest priority among the retransmission schemes that the LCHs (which data are included in the MAC PDU) map to.

In some embodiments, the terminal device 110-1 may receive, from the network device 120, one bit indication concerning a first retransmission scheme in the uplink grant. The terminal device 110-1 may determine whether a logical channel is able to use the uplink grant based on a priority and/or radio link control mode of the logical channel. If the priority exceeds a threshold priority and/or the radio link control mode is acknowledge mode (AM), the terminal device 110-1 may determine the logical channel is able to use the uplink grant. The terminal device 110-1 may transmit the data on the logical channel based on the first retransmission scheme.

Figure 4:
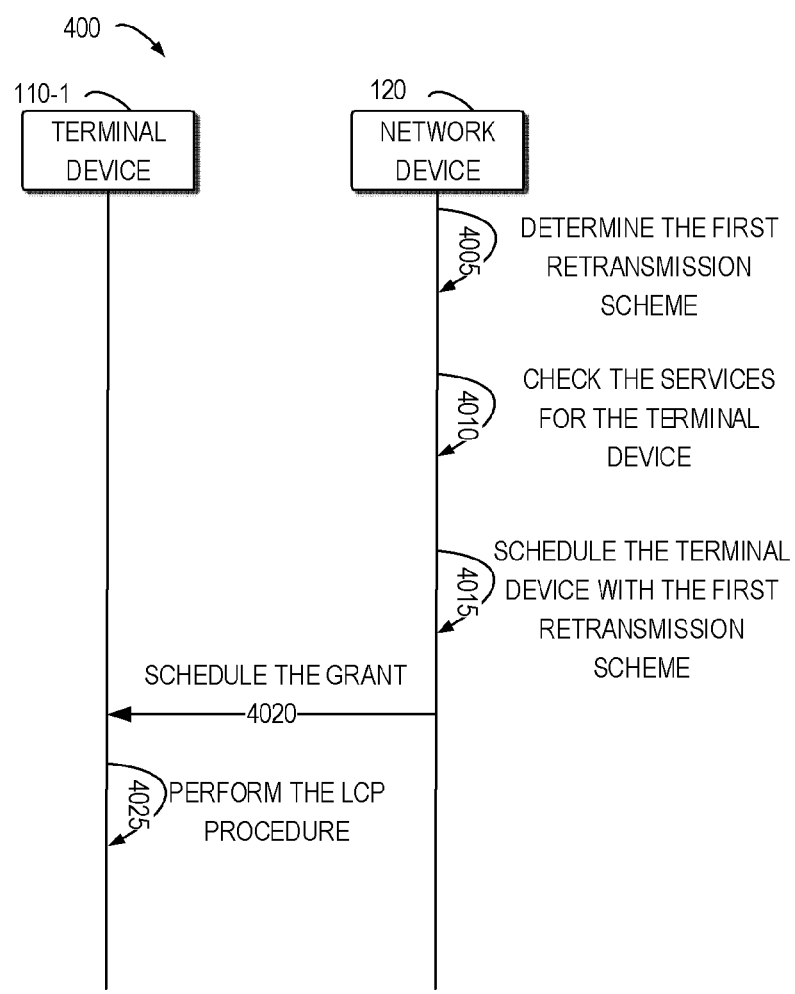
FIG. 4 illustrates a schematic diagram of interactions between devices according to according to some embodiments of the present disclosure.

FIG. 4 illustrates a schematic diagram of interactions 400 between devices according to according to some embodiments of the present disclosure where services are with the same retransmission scheme.

The network device 120 determines 4005 the first retransmission scheme when one radio bearer is established. The network device 120 checks 4010 the services for the terminal device 110-1 to determine whether the services can be supported with the first retransmission scheme. If the services can be supported with the first retransmission scheme, the network device 120 schedules 4015 the terminal device 110-1 with the first retransmission scheme. The network device 120 schedules 4020 the uplink grant. The terminal device 110-1 performs 4025 the legacy LCP procedure.

Figure 5:
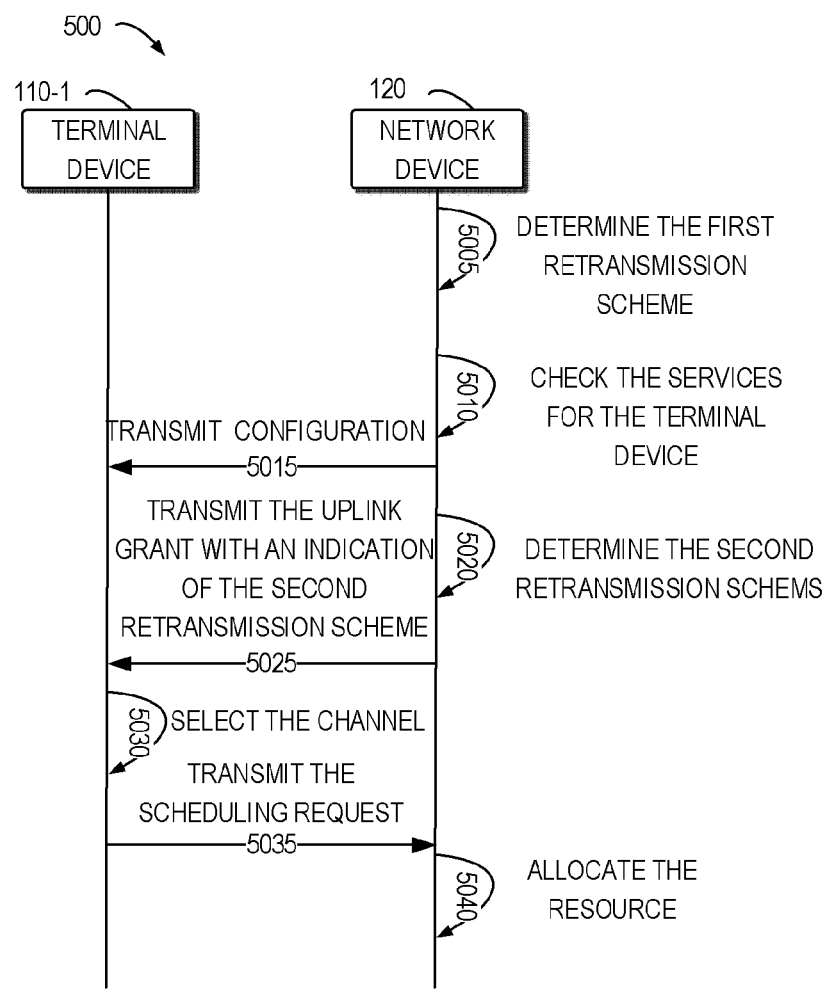
FIG. 5 illustrates a schematic diagram of interactions between devices according to according to some embodiments of the present disclosure.

FIG. 5 illustrates a schematic diagram of interactions 500 between devices according to according to some embodiments of the present disclosure where the services are with different retransmission schemes.

The network device 120 determines 5005 the first retransmission scheme when one radio bearer is established. The network device 120 checks 5010 the services for the terminal device 110-1 to determine whether the services can be supported with the first retransmission scheme. If the services need different retransmission schemes, the network device 120 transmits 5015 the configuration indicating the retransmission schemes. The network device 120 determines 5020 the second retransmission scheme and schedules the resource for the second service. The network device 120 schedules 5025 the uplink grant and the second retransmission scheme. The terminal device 110-1 select 5030 the logical channel and/or MAC CEs which is configured the same retransmission scheme requirement as the indicated retransmission scheme in the uplink grant and perform LCP procedure. If MAC CE is triggered and the indicated grant is different with the configured one, the terminal device 110-1 triggers scheduling request. The terminal device 110-1 transmits 5035 the scheduling request for the second retransmission scheme. The network device 120 allocates 5040 the resources with the second retransmission scheme for the MAC CE.

Figure 6:
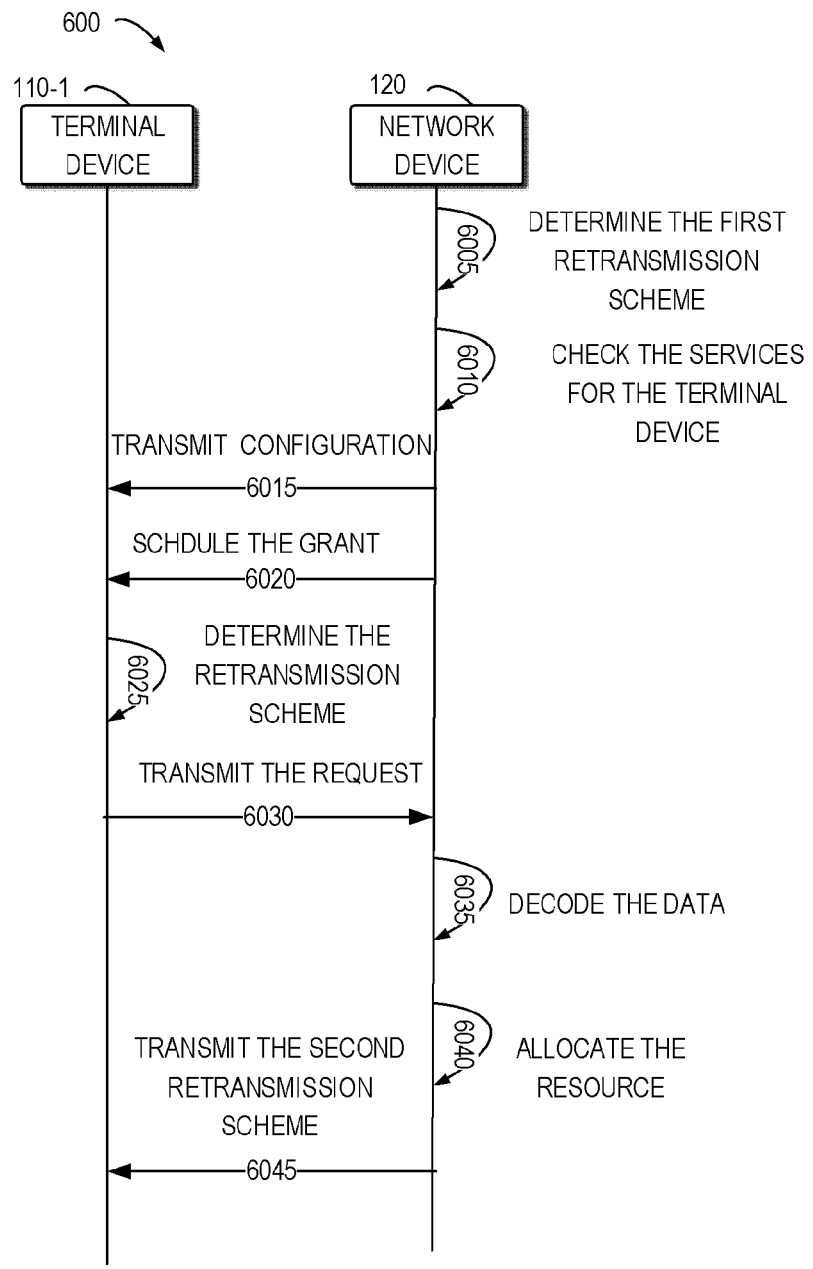
FIG. 6 illustrates a schematic diagram of interactions between devices according to according to some embodiments of the present disclosure.

FIG. 6 illustrates a schematic diagram of interactions 600 between devices according to according to some embodiments of the present disclosure where the services are with different retransmission schemes.

The network device 120 determines 6005 the first retransmission scheme when one radio bearer is established. The network device 120 checks 6010 the services for the terminal device 110-1 to determine whether the services can be supported with the first retransmission scheme. If the services need different retransmission schemes, the network device 120 may configure the retransmission schemes for the services. The network device 120 transmits 6015 the configuration to the terminal device 110-1. The network device 120 schedules 6020 the uplink grant without determination on the retransmission scheme.

The terminal device 110-1 may perform the LCP. The terminal device 110-1 determines 6025 the second retransmission scheme. The terminal device 110-1 transmits 6030 the scheduling request for the second retransmission scheme. The network device 120 decode 6035 the data of the second service. If the network device 120 fails decoding the data, the network device 120 allocates 6040 the resources with the second retransmission scheme. The network device 120 transmits 6045 information of the second retransmission scheme.

In some embodiments, an apparatus for performing the method 200 (for example, the network device 120) may comprise respective means for performing the corresponding steps in the method 200. These means may be implemented in any suitable manners. For example, it can be implemented by circuitry or software modules.

In some embodiments, the apparatus comprises: means for in accordance with an establishment of a link for a first device between a first device and a second device, receiving, at the first device and from the second device, configuration indicating at least one retransmission scheme, the at least one retransmission scheme satisfying a requirement of quality of at least one service of the first service; means for obtaining an uplink grant; and means for in accordance with a determination that data for at least one service is to be transmitted, transmitting the data for the at least one service on the first device based at least in part on the uplink grant.

In some embodiments, the means for transmitting the data comprises: means for receiving, from the second device, an indication concerning a first retransmission scheme in the uplink grant; means for determining a target service in the at least one service which is suitable for the first retransmission scheme; and means for transmitting the data for the target service based on the first retransmission scheme.

In some embodiments, the at least one service comprises a logical channel or medium access control (MAC) control element (CE).

In some embodiments, the means for transmitting the data comprises: means for receiving, from the second device, an indication concerning a first retransmission scheme in the uplink grant; means for in accordance with a determination that medium access control (MAC) control element (CE) is to be transmitted, determining whether the first retransmission scheme is applicable to the MAC CE; means for in response to the first retransmission scheme is inapplicable, transmitting a scheduling request for a second retransmission scheme; means for transmitting the MAC CE based on the first retransmission scheme to the second device; and means for storing the MAC CE until receiving an indication of success transmission of the MAC CE based on the first retransmission scheme or retransmitting the MAC CE based on the second retransmission scheme.

In some embodiments, the scheduling request comprises a scheduling request configuration of a highest priority logical channel with data buffered or a dedicated scheduling request configuration for requesting a further uplink grant of the second retransmission scheme.

In some embodiments, the means for transmitting the data comprises: means for receiving, from the second device, an indication concerning a first retransmission scheme in the uplink grant; means for in accordance with a determination that the data need to be transmitted on a logical channel with a second service, determining whether the first retransmission scheme is applicable to the logical channel; means for in response to the first retransmission scheme is inapplicable, transmitting a scheduling request to indicate the first retransmission scheme is inapplicable; and means for transmitting the data based on the first retransmission scheme to the second device.

In some embodiments, the apparatus comprises means for storing the data of the logical channel transmitted based on the first retransmission scheme until receiving an indication of success transmission of the data based on the first retransmission scheme or retransmitting the data based on the second retransmission scheme.

In some embodiments, the scheduling request comprises a scheduling request configuration of a highest priority logical channel with data buffered or a dedicated scheduling request configuration for requesting a further uplink grant of the second retransmission scheme.

In some embodiments, the apparatus further comprises means for determining retransmission schemes applicable to services on the first device; and means for transmitting, to the second device, a scheduling request indicating the retransmission schemes.

In some embodiments, the mean for determining the retransmission schemes comprises: means for determining a preferred retransmission scheme based on: a second requirement of quality of service of a logical channel with the highest priority on which the data is transmitted, or a retransmission scheme with highest priority among retransmission schemes that the logical channel on which the data is map to.

In some embodiments, the means for receiving the configuration comprises: means for receiving the configuration comprising at least one of: the at least one retransmission scheme, a hybrid automatic repeat request (HARQ) process associated with the at least one retransmission scheme, or at least one logical channel mapped to use a bit in downlink control information.

In some embodiments, the means for obtaining the uplink grant comprises means for receiving the uplink grant comprising at least one of: a first retransmission scheme, a hybrid automatic repeat request (HARQ) process associated with the first retransmission scheme, or a bit indicating whether at least one logical channel is suitable to the first retransmission scheme.

In some embodiments, the means for transmitting the data comprises: means for receiving, from the second device, one bit indication concerning a first retransmission scheme in the uplink grant; means for obtaining a first configuration list indicating a group of logical channels are able to use the uplink grant; means for determining whether a logical channel is able to use the uplink grant based on the first configuration list; means for in response to the logical channel is in the first configuration list, determining that the logical channel is able to use the uplink grant; and means for transmitting the data on the logical channel based on the first retransmission scheme.

In some embodiments, the means for transmitting the data comprises: means for receiving, from the second device, one bit indication concerning a first retransmission scheme in the uplink grant; means for obtaining a second configuration list indicating a group of logical channels are unable to use the uplink grant; means for determining whether a logical channel is able to use the uplink grant based on the second configuration list; means for in response to the logical channel is out of the second configuration list, determining that the logical channel is able to use the uplink grant; and means for transmitting the data on the logical channel based on the first retransmission scheme.

In some embodiments, the means for transmitting the data comprises: means for receiving, from the second device, one bit indication concerning a first retransmission scheme in the uplink grant; means for determining whether a logical channel is able to use the uplink grant based on a priority and/or radio link control mode of the logical channel; means for in response to the priority exceeding a threshold priority and/or the radio link control mode being acknowledge mode, determining the logical channel is able to use the uplink grant; and means for transmitting the data on the logical channel based on the first retransmission scheme.

In some embodiments, the first requirement comprises at least one of: a throughput requirement of the first service, a reliability requirement of the first service, or a latency requirement of the first service.

In some embodiments, the first device comprises a terminal device and the second device comprises a network device.

In some embodiments, an apparatus for performing the method 300 (for example, the terminal device 110-1) may comprise respective means for performing the corresponding steps in the method 300. These means may be implemented in any suitable manners. For example, it can be implemented by circuitry or software modules.

In some embodiments, the apparatus comprises means for in accordance with an establishment of a link for a first device between a first device and a second device, determining, at the second device, a first retransmission scheme used by the first device based at least in part on a first requirement of quality of service of a first service; means for comparing the first retransmission scheme with a second retransmission scheme used by a second service; means for generating configuration at least comprising the first retransmission scheme based on the comparison; and means for transmitting the configuration to the first device.

In some embodiments, the means for determining the first retransmission scheme comprises: means for determining the first retransmission scheme based on the first requirement, a capability of the first device, a network capability and round trip time.

In some embodiments, the means for generating the configuration comprises: means for in response to the first retransmission scheme is different from the second retransmission scheme, generating the configuration indicating the first retransmission scheme and the second retransmission scheme.

In some embodiments, the apparatus comprises means for transmitting, to the first device, an indication concerning a first retransmission scheme in the uplink grant.

In some embodiments, the apparatus comprises means for transmitting an uplink grant to the first device.

In some embodiments, the means for transmitting the uplink grant comprises means for transmitting the uplink grant comprising at least one of: the first retransmission scheme, a hybrid automatic repeat request (HARQ) process associated with the first retransmission scheme, or a bit indicating whether at least one logical channel is suitable to the first retransmission scheme.

In some embodiments, the means for receiving the configuration comprises: means for receiving the configuration comprising at least one of: the first retransmission scheme, a hybrid automatic repeat request (HARQ) process associated with the first retransmission scheme, or at least one logical channel mapped to use a bit in downlink control information.

In some embodiments, the first requirement comprises at least one of: a throughput requirement of the first service, a reliability requirement of the first service, or a latency requirement of the first service. In some embodiments, the apparatus comprises means for receiving data from the first device; means for receiving, from the first device, a scheduling request indicating retransmission schemes applicable to services on the first device; means for in response to failing to decode the data, determining a second retransmission scheme for the data based on the scheduling request; means for scheduling a resource for the data; and means for transmitting an uplink grant indicating the resource and the second retransmission scheme to the first device.

In some embodiments, the means for receiving the scheduling request comprises means for receiving the scheduling request comprising a preferred retransmission scheme.

In some embodiments, the apparatus further comprises means for receiving, from the first device, a scheduling request for a third retransmission scheme for medium access control (MAC) control element (CE); means for allocating a resource for transmitting the MAC CE; means for determining a third retransmission scheme for the data; and means for transmitting an uplink grant indicating the resource and the third retransmission scheme to the first device.

In some embodiments, the apparatus further comprises means for transmitting the uplink grant indicating a target retransmission scheme to the first device; means for receiving a scheduling request to indicate the target retransmission scheme is inapplicable to a logical channel with a third service; and means for determining a third retransmission scheme.

In some embodiments, the apparatus comprises means for generating one bit indication concerning a first retransmission scheme in the uplink grant; and mans for transmitting the one bit indication to the first device.

In some embodiments, the means for transmitting the data comprises: means for generating a first configuration list indicating a group of logical channels are able to use the uplink grant; and means for transmitting the first configuration list to the first device.

In some embodiments, the means for transmitting the data comprises means for generating a second configuration list indicating a group of logical channels are unable to use the uplink grant; and means for transmitting the second configuration list to the first device.

In some embodiments, the first device comprises a terminal device and the second device comprises a network device.

In some embodiments, the first service comprises a logical channel or medium access control (MAC) control element (CE).

Figure 7:
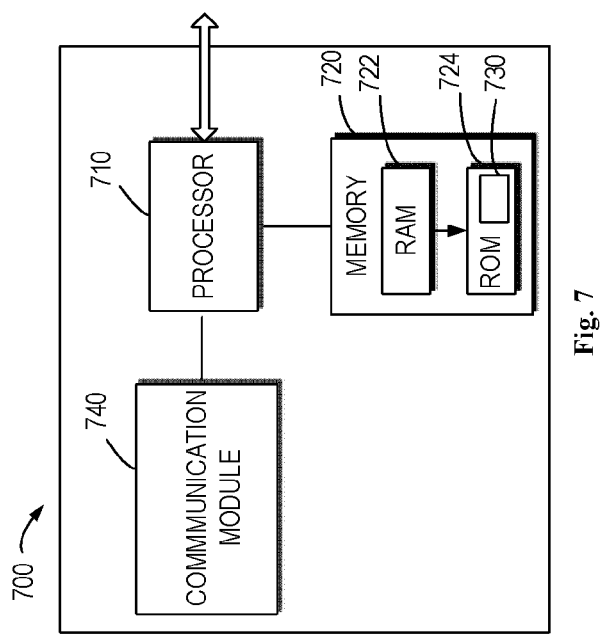
FIG. 7 illustrates a simplified block diagram of an apparatus that is suitable for implementing embodiments of the present disclosure.

FIG. 7 is a simplified block diagram of a device 700 that is suitable for implementing embodiments of the present disclosure. The device 700 may be provided to implement the communication device, for example the terminal device 110, or the network device 120 as shown in FIG. 1. As shown, the device 700 includes one or more processors 610, one or more memories 720 coupled to the processor 710, and one or more communication modules 740 coupled to the processor 710.

The communication module 740 is for bidirectional communications. The communication module 740 has at least one antenna to facilitate communication. The communication interface may represent any interface that is necessary for communication with other network elements.

The processor 710 may be of any type suitable to the local technical network and may include one or more of the following: general purpose computers, special purpose computers, microprocessors, digital signal processors (DSPs) and processors based on multicore processor architecture, as non-limiting examples. The device 700 may have multiple processors, such as an application specific integrated circuit chip that is slaved in time to a clock which synchronizes the main processor.

The memory 720 may include one or more non-volatile memories and one or more volatile memories. Examples of the non-volatile memories include, but are not limited to, a Read Only Memory (ROM) 724, an electrically programmable read only memory (EPROM), a flash memory, a hard disk, a compact disc (CD), a digital video disk (DVD), and other magnetic storage and/or optical storage. Examples of the volatile memories include, but are not limited to, a random access memory (RAM) 722 and other volatile memories that will not last in the power-down duration.

A computer program 730 includes computer executable instructions that are executed by the associated processor 710. The program 730 may be stored in the ROM 724. The processor 710 may perform any suitable actions and processing by loading the program 730 into the RAM 722.

The embodiments of the present disclosure may be implemented by means of the program 720 so that the device 700 may perform any process of the disclosure as discussed with reference to FIGS. 2 and 6. The embodiments of the present disclosure may also be implemented by hardware or by a combination of software and hardware.

In some example embodiments, the program 730 may be tangibly contained in a computer readable medium which may be included in the device 700 (such as in the memory 720) or other storage devices that are accessible by the device 700. The device 700 may load the program 730 from the computer readable medium to the RAM 722 for execution. The computer readable medium may include any types of tangible non-volatile storage, such as ROM, EPROM, a flash memory, a hard disk, CD, DVD, and the like. FIG. 8 shows an example of the computer readable medium 800 in form of CD or DVD. The computer readable medium has the program 730 stored thereon.

It should be appreciated that future networks may utilize network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications, this may mean node operations to be carried out, at least partly, in a central/centralized unit, CU, (e.g. server, host or node) operationally coupled to distributed unit, DU, (e.g. a radio head/node). It is also possible that node operations will be distributed among a plurality of servers, nodes or hosts. It should also be understood that the distribution of labor between core network operations and base station operations may vary depending on implementation.

In an embodiment, the server may generate a virtual network through which the server communicates with the distributed unit. In general, virtual networking may involve a process of combining hardware and software network resources and network functionality into a single, software-based administrative entity, a virtual network. Such virtual network may provide flexible distribution of operations between the server and the radio head/node. In practice, any digital signal processing task may be performed in either the CU or the DU and the boundary where the responsibility is shifted between the CU and the DU may be selected according to implementation.

Therefore, in an embodiment, a CU-DU architecture is implemented. In such case the device 600 may be comprised in a central unit (e.g. a control unit, an edge cloud server, a server) operatively coupled (e.g. via a wireless or wired network) to a distributed unit (e.g. a remote radio head/node). That is, the central unit (e.g. an edge cloud server) and the distributed unit may be stand-alone apparatuses communicating with each other via a radio path or via a wired connection. Alternatively, they may be in a same entity communicating via a wired connection, etc. The edge cloud or edge cloud server may serve a plurality of distributed units or a radio access networks. In an embodiment, at least some of the described processes may be performed by the central unit. In another embodiment, the device 600 may be instead comprised in the distributed unit, and at least some of the described processes may be performed by the distributed unit.

In an embodiment, the execution of at least some of the functionalities of the device 600 may be shared between two physically separate devices (DU and CU) forming one operational entity. Therefore, the apparatus may be seen to depict the operational entity comprising one or more physically separate devices for executing at least some of the described processes. In an embodiment, such CU-DU architecture may provide flexible distribution of operations between the CU and the DU. In practice, any digital signal processing task may be performed in either the CU or the DU and the boundary where the responsibility is shifted between the CU and the DU may be selected according to implementation. In an embodiment, the device 600 controls the execution of the processes, regardless of the location of the apparatus and regardless of where the processes/functions are carried out.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the methods 400-600 as described above with reference to FIGS. 3-6. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A method comprising:
    receiving, at a first device and from a second device, a configuration indicating at least one retransmission scheme associated with at least one service;
    obtaining an uplink grant indicating a hybrid automatic repeat request (HARQ) process associated with a first retransmission scheme, wherein the uplink grant is preconfigured;
    selecting only services configured with the same retransmission scheme as the first retransmission scheme associated with uplink grant to use the uplink grant; and
    in accordance with a determination that data for the at least one service is to be transmitted, transmitting the data for the at least one service based at least in part on the uplink grant and the at least one retransmission scheme.

2. The method of claim 1, wherein transmitting the data in accordance with a determination that data for at least one service is to be transmitted comprises:
    receiving an indication concerning a first retransmission scheme in the uplink grant;
    determining, based on the at least one retransmission scheme, a target service in the at least one service which is suitable for the first retransmission scheme; and
    transmitting the data for the target service based on the first retransmission scheme.

3. The method of claim 1, wherein the at least one service comprises at least one of a logical channel or medium access control (MAC) control element (CE).

4. The method of claim 1, wherein the first device comprises a terminal device and the second device comprises a network device.

5. The method of claim 1, wherein receiving the configuration comprises:
    receiving the configuration comprising at least one of: the at least one retransmission scheme, a hybrid automatic repeat request (HARQ) process associated with the at least one retransmission scheme, or at least one logical channel mapped to use a bit in downlink control information.

6. The method of claim 1, wherein obtaining the uplink grant comprises:
    receiving the uplink grant comprising at least one of: a first retransmission scheme, the hybrid automatic repeat request (HARQ) process associated with the first retransmission scheme, or a bit indicating whether at least one logical channel is suitable to the first retransmission scheme.

7. The method of claim 1, wherein transmitting the data in accordance with a determination that data for at least one service is to be transmitted comprises:
    receiving a one bit indication concerning a first retransmission scheme in the uplink grant;
    obtaining a first configuration list indicating a group of logical channels are able to use the uplink grant;
    determining whether a logical channel is able to use the uplink grant based on the first configuration list;

in response to the logical channel being in the first configuration list, determining that the logical channel is able to use the uplink grant; and
transmitting the data on the logical channel based on the first retransmission scheme.

8. A first device comprising:
at least one processor; and
at least one memory including computer program codes;
the at least one memory and the computer program codes are configured to, with the at least one processor, cause the first device to at least:
receive, at the first device and from a second device, a configuration indicating at least one retransmission scheme associated with at least one service;
obtain an uplink grant indicating a hybrid automatic repeat request (HARQ) process associated with a first retransmission scheme, wherein the uplink grant is preconfigured;
select only services configured with the same retransmission scheme as the first retransmission scheme associated with uplink grant to use the uplink grant; and
in accordance with a determination that data for the at least one service is to be transmitted, transmit the data for the at least one service based at least in part on the uplink grant and the at least one retransmission scheme.

9. The first device of claim 8, wherein transmitting the data in accordance with a determination that data for at least one service is to be transmitted comprises:
receiving an indication concerning a first retransmission scheme in the uplink grant;
determining, based on the at least one retransmission scheme, a target service in the at least one service which is suitable for the first retransmission scheme; and
transmitting the data for the target service based on the first retransmission scheme.

10. The first device of claim 8, wherein the at least one service comprises at least one of a logical channel or medium access control (MAC) control element (CE).

11. The first device of claim 8, wherein transmitting the data in accordance with a determination that data for at least one service is to be transmitted comprises:
receiving an indication concerning a first retransmission scheme in the uplink grant;
in accordance with a determination that a medium access control (MAC) control element (CE) is to be transmitted, determining whether the first retransmission scheme is applicable to the MAC CE;
in response to the first retransmission scheme being inapplicable, transmitting a scheduling request for a second retransmission scheme to the second device;
transmitting the MAC CE based on the first retransmission scheme to the second device; and
storing the MAC CE until receiving an indication of successful transmission of the MAC CE based on the first retransmission scheme or retransmitting the MAC CE based on the second retransmission scheme.

12. The first device of claim 8, wherein transmitting the data in accordance with a determination that data for at least one service is to be transmitted comprises:
receiving an indication concerning a first retransmission scheme in the uplink grant;
in accordance with a determination that the data need to be transmitted on a logical channel with a second service, determining whether the first retransmission scheme is applicable to the logical channel;
in response to the first retransmission scheme being inapplicable, transmitting a scheduling request to indicate the first retransmission scheme is inapplicable; and
transmitting the data based on the first retransmission scheme to the second device.

13. The first device of claim 12, wherein transmitting the data in accordance with a determination that data for at least one service is to be transmitted further comprises:
storing the data of the logical channel transmitted based on the first retransmission scheme until receiving an indication of successful transmission of the data based on the first retransmission scheme or retransmitting the data based on a second retransmission scheme.

14. The first device of claim 8, wherein the apparatus is further caused to:
determine retransmission schemes applicable to the at least one service on the first device; and
transmit, to the second device, a scheduling request indicating the retransmission schemes.

15. The first device of claim 8, wherein receiving the configuration comprises:
receiving the configuration comprising at least one of: the at least one retransmission scheme, the hybrid automatic repeat request (HARQ) process associated with the at least one retransmission scheme, or at least one logical channel mapped to use a bit in downlink control information.

16. The first device of claim 8, wherein obtaining the uplink grant comprises:
receiving the uplink grant further comprising at least one of: a first retransmission scheme, or a bit indicating whether at least one logical channel is suitable to the first retransmission scheme.

17. The first device of claim 8, wherein transmitting the data in accordance with a determination that data for at least one service is to be transmitted comprises:
receiving a one bit indication concerning a first retransmission scheme in the uplink grant;
obtaining a first configuration list indicating a group of logical channels are able to use the uplink grant;
determining whether a logical channel is able to use the uplink grant based on the first configuration list;
in response to the logical channel being in the first configuration list, determining that the logical channel is able to use the uplink grant; and
transmitting the data on the logical channel based on the first retransmission scheme.

18. The first device of claim 8, wherein transmitting the data in accordance with a determination that data for at least one service is to be transmitted comprises:
receiving a one bit indication concerning a first retransmission scheme in the uplink grant;
obtaining a second configuration list indicating a group of logical channels are unable to use the uplink grant;
determining whether a logical channel is able to use the uplink grant based on the second configuration list;
in response to the logical channel being out of the second configuration list, determining that the logical channel is able to use the uplink grant; and
transmitting the data on the logical channel based on the first retransmission scheme.

19. The first device of claim 8, wherein transmitting the data in accordance with a determination that data for at least one service is to be transmitted comprises:
receiving a one bit indication concerning a first retransmission scheme in the uplink grant;

determining whether a logical channel is able to use the uplink grant based on a priority and/or radio link control mode of the logical channel;

in response to the priority exceeding a threshold priority and/or the radio link control mode being an acknowledge mode, determining the logical channel is able to use the uplink grant; and transmitting the data on the logical channel based on the first retransmission scheme.

20. A second device comprising:

at least one processor; and at least one memory including computer program codes;

the at least one memory and the computer program codes are configured to, with the at least one processor, cause the second device to at least:

send, to a first device, a configuration indicating at least one retransmission scheme associated with at least one service;

send an uplink grant to the first device, wherein the uplink grant indicates a hybrid automatic repeat request (HARQ) process associated with a first retransmission scheme, wherein the uplink grant is preconfigured;

cause the first device to determine, based on the at least one retransmission scheme, a target service in the at least one service which is suitable for the first retransmission scheme by selecting only services configured with the same retransmission scheme as the first retransmission scheme associated with uplink grant to use the uplink grant; and receive data for the target service based on the first retransmission scheme.

* * * * *